US009610642B2

(12) United States Patent
Sanchez et al.

(10) Patent No.: US 9,610,642 B2
(45) Date of Patent: Apr. 4, 2017

(54) PROCESS AND APPARATUS FOR MANUFACTURING AN ABRASIVE WIRE

(71) Applicants: Commissariat à l'énergie atomique et aux énergies alternatives, Paris (FR); Thermocompact, Metz Tessy (FR); Centre National de la Recherche Scientifique, Paris (FR)

(72) Inventors: Gérald Sanchez, Dingy Saint Clair (FR); Michel Ly, Annecy (FR); Sophie Rivoirard, Lans en Vercors (FR); Arnaud Griffond, Saint Martin d'heres (FR)

(73) Assignees: Commissariat À L'Énergie Atomique Et Aux Énergies Alternatives, Paris (FR); Thermocompact, Metz Tessy (FR); Centre National de la Recherche Scientifique, Paris (FR)

( * ) Notice: Subject to any disclaimer, the term of this patent is extended or adjusted under 35 U.S.C. 154(b) by 363 days.

(21) Appl. No.: 14/390,292

(22) PCT Filed: Mar. 29, 2013

(86) PCT No.: PCT/EP2013/056817
§ 371 (c)(1),
(2) Date: Oct. 2, 2014

(87) PCT Pub. No.: WO2013/149965
PCT Pub. Date: Oct. 10, 2013

(65) Prior Publication Data
US 2015/0068131 A1   Mar. 12, 2015

(30) Foreign Application Priority Data

Apr. 2, 2012 (FR) ...................... 12 53017

(51) Int. Cl.
B24B 1/00 (2006.01)
B24D 11/00 (2006.01)
(Continued)

(52) U.S. Cl.
CPC ........ *B23D 61/185* (2013.01); *B24B 27/0633* (2013.01); *B24D 18/0018* (2013.01);
(Continued)

(58) Field of Classification Search
None
See application file for complete search history.

(56) References Cited

U.S. PATENT DOCUMENTS 4,612,470 A * 9/1986 Smith, Jr. ............... H02K 1/12
310/273
4,719,380 A * 1/1988 Smith, Jr. ............... H02K 1/12
310/114
(Continued)

FOREIGN PATENT DOCUMENTS

CN  101780664  7/2010
EP  0243825    4/1987
(Continued)

*Primary Examiner* — Kaj K Olsen
*Assistant Examiner* — Ross J Christie
(74) *Attorney, Agent, or Firm* — Occhiuti & Rohlicek LLP

(57) ABSTRACT

A process for manufacturing an abrasive wire formed by abrasive particles held on a central core by a binder comprises depositing abrasive particles on the central core, each particle comprising a magnetic material that has a relative permeability greater than 50 and that represents at least 1% of the volume of the abrasive particle, and depositing binder on the central core to keep the abrasive particles attached to it. The core has south poles and north poles alternating along either its circumference or its length.

13 Claims, 5 Drawing Sheets

(51) Int. Cl.
    *B23D 61/18*     (2006.01)
    *B24B 27/06*     (2006.01)
    *C25D 5/00*     (2006.01)
    *C25D 7/06*     (2006.01)
    *C25D 7/10*     (2006.01)
    *B24D 18/00*     (2006.01)
    *C23C 18/16*     (2006.01)

(52) U.S. Cl.
    CPC ...... *B24D 18/0072* (2013.01); *C23C 18/1628* (2013.01); *C25D 5/00* (2013.01); *C25D 5/006* (2013.01); *C25D 7/0607* (2013.01); *C25D 7/10* (2013.01)

(56) References Cited

U.S. PATENT DOCUMENTS

| | | |
|---|---|---|
| 5,181,939 A | 1/1993 | Neff |
| 5,250,084 A | 10/1993 | Lansell et al. |
| 8,677,986 B2 | 3/2014 | Kazahaya et al. |
| 2008/0171175 A1 | 7/2008 | Park |
| 2011/0263187 A1 | 10/2011 | Liu et al. |
| 2011/0308371 A1 | 12/2011 | Morita et al. |

FOREIGN PATENT DOCUMENTS

| | | |
|---|---|---|
| EP | 0696494 | 2/1996 |
| EP | 2260963 | 12/2010 |
| EP | 2 428 317 | 3/2012 |
| JP | 0985735 | 3/1997 |
| JP | 10328932 | 12/1998 |
| JP | 11245154 | 9/1999 |
| JP | 11320379 | 11/1999 |
| JP | 2003-275970 | 9/2003 |
| JP | 2004-009238 | 1/2004 |
| JP | 2004-050301 | 2/2004 |
| WO | 2010071198 | 6/2010 |
| WO | 2011-042931 | 4/2011 |
| WO | 2011042931 | 4/2011 |

* cited by examiner

PROCESS AND APPARATUS FOR MANUFACTURING AN ABRASIVE WIRE

RELATED APPLICATIONS

This application is the national stage of PCT/EP2013/056817, filed on Mar. 29, 2013, which claims the benefit of the Apr. 2, 2012 priority date of French application FR 1253017, the content of which is herein incorporated by reference.

FIELD OF DISCLOSURE

The invention relates to a process and an apparatus for manufacturing an abrasive wire, and to a wire manufactured by this process.

BACKGROUND

Known processes for manufacturing an abrasive wire include the deposition of magnetic abrasive particles on a central core and the use of a binder to hold the abrasive particles to this central core.

Permanent magnetic induction has been used to attract particles to the core. Magnetic induction in the longitudinal direction has proven to be rather ineffective for rapidly attracting abrasive particles to the central core, and, as a result, the manufacture of the abrasive wire is not truly faster. Magnetic induction in a radial direction leads to a very non-uniform distribution of abrasive particles around the circumference of the core. This is because such particles mainly concentrate on the south pole and the north pole of the central core. Between these two zones around each pole, there are almost no abrasive particles. Thus, in the latter case, the increase in productivity comes at the cost of a loss of uniformity in the distribution of abrasive particles over the surface of the central core.

SUMMARY

An object of the invention is to provide a faster manufacturing process that preserves a uniform distribution of particles over the surface of the central core.

In the above manufacturing process, during the deposition step, magnetic abrasive particles are attracted by the central core via an attractive magnetic force created by a radial magnetic induction. This accelerates deposition of the magnetic abrasive particles on the central core. Because the deposition of magnetic abrasive particles on the central core is accelerated, the above manufacturing process is faster.

In addition, magnetizing the central core with a plurality of south poles and a plurality of north poles distributed around the circumference of the central core and/or over the length of the central core allows the abrasive particles to be positioned with greater uniformity when poles distributed circumferentially around the wire and/or with greater density when poles are distributed longitudinally along the wire. Thus, it is possible to accelerate the deposition of abrasive particles on the core and, at the same time, to increase the uniformity of the distribution of abrasive particles on the core. This increase in productivity obtained by virtue of more rapid deposition of the abrasive particles on the core can be achieved while limiting deterioration in the uniformity of the distribution of the particles over the surface of the core.

Creating the magnetic induction before the magnetic abrasive particles have been deposited also makes it possible to remove or limit the need for an external magnetic field during the deposition of the magnetic abrasive particles. Specifically, the presence of an external magnetic field during the deposition magnetizes the magnetic abrasive particles. If this magnetization is too strong relative to the agitation of the electrolysis bath, then the particles have a tendency to agglomerate in order to form masses of abrasive particles. The presence of such masses in the electrolyte bath is undesirable.

In addition, the density of magnetic abrasive particles on the surface of the central core is increased.

In one aspect, the invention features a process for manufacturing an abrasive wire formed by abrasive particles that are kept on a central core by a binder. Such a process includes providing a central core, depositing magnetic abrasive particles on the central core, and depositing a binder on the central core. The central core includes a surface with alternating north and south poles disposed thereon. The poles alternate along either the circumferential direction of the length, or longitudinal direction, of the core. As a result of this alternating distribution, a south pole is adjacent to two north poles, and a north pole is adjacent to two south poles. Each magnetic abrasive particle includes a magnetic material having a relative permeability that is higher than 50, with the amount of magnetic material represents at least 1% of a volume of the magnetic abrasive particle. Depositing the magnetic abrasive particles creates a magnetic interaction between the central core and the abrasive particles that attracts the abrasive particles to the central core. Depositing the binder on the central core results in keeping the abrasive particles attached to the central core.

In some practices, providing a central core includes providing a central core that has, at each south pole and at each north pole on the surface thereof, a permanent magnetic induction that is higher than 0.1 mT and is directed in a radial direction of the central core. Among these are embodiments in which the permanent magnetic induction that is greater than 0.4 mT.

Other practices include those in which providing a central core includes providing a central core that has a permanent magnetic induction of at least 1 mT, where the magnetic induction has a direction that is within ±10° of a longitudinal direction of the central core. Among these are practices that include, before providing the central core, applying a first external magnetic field to magnetize the central core, and applying a second external magnetic field to magnetize the central core. In these practices, the central core, as a result of having been magnetized by the first external magnetic field, has a first magnetic moment aligned with a longitudinal direction of the central core, and as a result of having been magnetized by the second external magnetic field, the central core has a second magnetic moment that is parallel to the first magnetic moment and directed in a direction opposite that of the first magnetic moment.

In other practices, depositing magnetic abrasive particles on the central core, and depositing a binder on the central core are carried out at least twice.

In yet other practices, depositing a binder on the central core includes moving the central core in a longitudinal direction thereof inside an electrolyte bath. In these practices, the electrolyte bath includes ions of the binder. Such practices also include applying an electric potential difference between the moving central core and a working electrode to cause deposition by electrolysis of the binder on the central core.

In other practices, depositing a binder on the central core includes depositing the binder on the central core by electrolysis.

An advantage of the foregoing process is that permanently magnetizing the central core limits agglomeration of the magnetic abrasive particles together and may also avoid the need for an external magnetic field as a magnetic-field source capable of attracting the magnetic abrasive particles to the central core.

Another advantage is that using a central core magnetized parallel to its axis causes a permanent radial magnetic induction greater than 0.1 mT to appear on the surface of the central core, distributed over its entire circumference, thereby increasing the uniformity of the distribution of the magnetic abrasive particles around the circumference of this central core.

Yet another advantage is that repeating the steps of depositing particles and depositing binder a plurality of times makes it possible to obtain a multilayered wire the operational lifetime of which is increased.

In another aspect, the invention features an apparatus for manufacturing abrasive wire formed by abrasive particles that are held on a central core by a binder. Such an apparatus includes a particle-deposition unit, a binder-deposition unit, and a magnetizing device.

The particle-deposition unit is configured for depositing magnetic abrasive particles on the central core, each of which includes magnetic material, and each of which has a relative permeability that is greater than 50. The magnetic material represents at least 1% of a volume of the magnetic abrasive particle.

The binder-deposition unit is configured for depositing the binder on the central core to keep the abrasive particles attached to the central core.

The magnetizing device is configured to magnetize the central core such that, prior to entry into the particle-deposition unit for deposition of abrasive particles thereon, the central core has north and south poles alternating along a surface thereof in a either direction the circumferential direction or the longitudinal direction of the core. The north poles and the south poles attract the magnetic abrasive particles to the central core during deposition of the magnetic abrasive particles on the central core.

In another aspect, the invention features a manufacture including an abrasive wire. Such an abrasive wire includes a central core and magnetic abrasive particles. The magnetic abrasive particles are held on the central core by a binder. The central core includes north poles and south poles disposed on its surface. The north poles and the south poles alternate either around the core's circumference or along its length.

In some embodiments, the central core has a remnant magnetization greater than 5 mT.

In other embodiments, the magnetic abrasive particles comprise oblong particles, each of which has a major axis and a minor axis. An angle exists between the major axis and a line normal to the surface of the central core that passes through the oblong particle. For at least 80% of the oblong particles, this angle is between 0° and 70°.

In another embodiment, for at least 85% of the magnetic abrasive particles, a shortest distance between the magnetic abrasive particle and the surface of the central core is within ±1 µm of a constant value.

In another aspect, the invention features a process for manufacturing an abrasive wire formed by abrasive particles held on a central core by a binder includes depositing abrasive particles on the central core, each particle including a magnetic material that has a relative permeability greater than 50 and that represents at least 1% of the volume of the abrasive particle, and depositing binder on the central core to keep the abrasive particles attached to it. The core has south poles and north poles alternating along either its circumference or its length.

In this description, when relative permeability values are given for a magnetic material, they are for a frequency of zero.

The terms "magnetic induction" and "magnetization" are used synonymously. The terms "remanent magnetic induction" or "magnetic remanence" are also used synonymously. This is the magnetic induction generated, in the absence of an external magnetic field, by a magnetic material that has previously been magnetized. In this case, the magnetic material is also said to have a remanent magnetization or to be permanently magnetized.

As used herein, "magnetize" will be understood to mean causing a part to have a non-zero magnetic moment. The magnetization of the part may be permanent, i.e. it may remain even in the absence of an external magnetic field. Such magnetization will be referred to as "permanent magnetization."

A part is said to form a permanent magnet if the permanent magnetic induction on its surface is greater than 0.1 mT at room temperature. The materials used to produce a permanent magnet are generally hard magnetic materials. As used herein, the term "hard magnetic material" is understood to mean a material that has a coercivity greater than 5 mT and, preferably, greater than 10 mT or 50 mT. Generally, these are materials comprising a large amount of iron, cobalt, nickel, and/or rare earths. The expression "large amount" is understood to mean that more than half or more than 90% of the weight of the material is made up from one or a combination of these elements.

The magnetization of the part may also disappear once this magnetic material is no longer exposed to an external magnetic field. This part therefore does not have a permanent magnetization. As used herein, a part is considered to be demagnetized if its permanent magnetization is strictly lower than 0.1 mT and, typically, lower than 0.05 mT. Generally, the part is then made of a soft magnetic material, i.e. materials that have a coercivity that is strictly lower than 1 mT.

BRIEF DESCRIPTION OF THE DRAWINGS

The invention will be better understood on reading the following description, given merely by way of non-limiting example and with reference to the drawings, in which.

In these figures, the same references are used to denote the same elements.

In the rest of this description, features and functions that are well known in the art will not be described in detail

DETAILED DESCRIPTION

Figure 1:
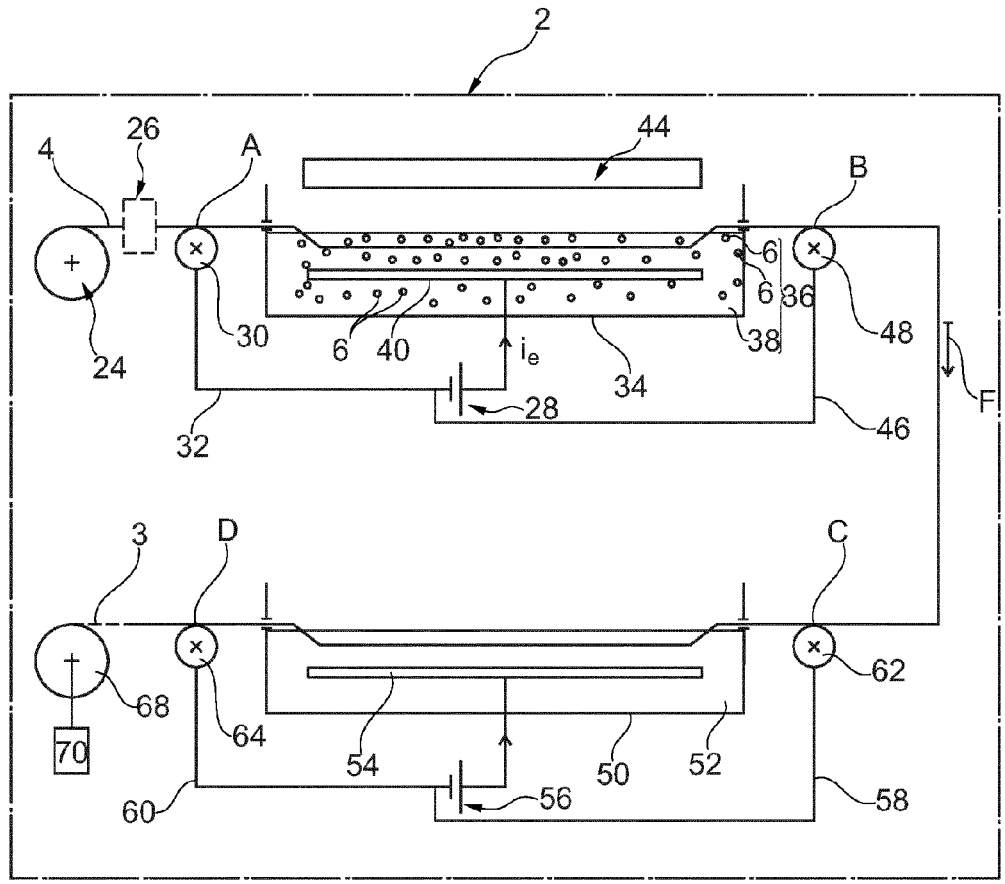
FIG. 1 is a schematic illustration of an apparatus for manufacturing an abrasive wire.

FIG. 1 shows an apparatus 2 for manufacturing abrasive wire 3 to be used to cut through hard materials via wear or abrasion. A material is considered to be hard if its microhardness on the Vickers scale is greater than 400 Hv50 or greater than or equal to 4 on the Mohs scale. In this description, Vickers microhardness is expressed for a load of 50 grams of force, i.e. for a force of 0.49 N. However, a person skilled in the art will know that it is necessary to adjust the load depending on the thickness of the material on which the measurements are made in order for the size of the Vickers indent to be smaller than the thickness of the material. Abrasive wire 3 described herein is intended for cutting single-crystal silicon, polysilicon, or even sapphire or silicon carbide.

Figure 2:
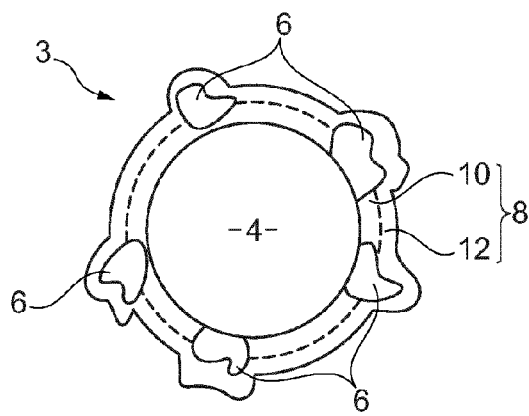
FIG. 2 is a cross-sectional illustration of the abrasive wire manufactured using the apparatus in FIG. 1.
Figure 3:
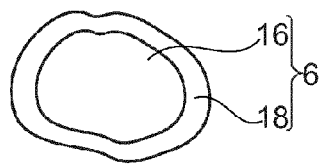
FIG. 3 is a schematic cross-sectional illustration of a magnetic abrasive particle of the wire in FIG. 2.

Referring to FIGS. 2 and 3, abrasive wire 3 comprises a central core 4. Magnetic abrasive particles 6 attach to the around the circumference of the core 4 by a binder 8. Typically, the central core 4 is a wire having a tensile strength greater than 2000 MPa or 3000 MPa and, generally, lower than 5000 MPa.

An "elongation at break" of a core 4 represents the increase in the length of the central core 4 before the central core 4 breaks. The elongation at break of the central core 4 is greater than 1% and, preferably, greater than 2%. In contrast, the elongation at break of the central core 4 must not be too great, and is preferably below 10% or 5%.

In the illustrated embodiment, the central core 4 has a circular cross section with a diameter of between 70 μm and 1 mm. The diameter of the central core 4 often depends on the material that is to be cut with the abrasive wire 3. For example, when ingots of silicon are to be cut, the diameter of the central core 4 lies between 200 μm and 450 μm or 1 mm. When silicon wafers are to be cut, it lies between 70 and 100 or 200 μm.

In some embodiments, the central core 4 is made of an electrically conductive material. A material is considered to be electrically conductive if its resistivity is lower than $10^{-5}$ Ω·m at 20° C.

In some embodiments, the central core 4 is also made of a magnetic material, the relative permeability of which is greater than 50 and, preferably, greater than 100 or 200. For example, the central core 4 may be made of steel, carbon, or ferretic stainless steel or brass-plated steel. The linear density of the core 6 lies, for example, between 10 mg/m and 500 mg/m and, preferably, between 50 mg/m and 200 mg/m.

The abrasive particles 6 form teeth on the surface of the central core 4. These teeth erode the material to be cut. The abrasive particles 6 must therefore be harder than the material to be cut.

The diameter of the abrasive particles 6 lies between 1 μm and 500 μm and is smaller than a third of the diameter of central core 4. In some embodiments, the diameters of the particles 6 lie between 10 μm and 22 μm for a core 0.12 mm in diameter. When the abrasive particles 6 are not spheres, the diameter corresponds to the largest hydraulic diameter of the particles 6.

The binder 8 keeps the abrasive particles 6 attached with no degree of freedom to the central core 4. Preferably, the binder 8 is a metal binder because such binders are harder than resins and therefore hold the abrasive particles 6 more effectively on the central core 4. In one embodiment, the binder is nickel.

In the illustrated embodiment, the binder 8 is deposited as a first binder layer 10 and a second binder layer 12 in succession. The first binder layer 10 is relatively thin. In one embodiment, its thickness is less than half the average diameter of the particles 6. This first layer 10 is used to weakly attach the abrasive particles 6 to the central core 4.

The second binder layer 12, which prevents abrasive particles 6 from being torn off when the abrasive wire 3 is in use, is thicker. In some embodiments, the thickness of the second binder layer 12, in the radial direction, is more than 0.5 times the average diameter of the abrasive particles 6. The thickness of the second binder layer 12 is generally greater than or equal to 0.7 times the average diameter of the abrasive particles 6. However, the thickness of the second binder layer 12 is conventionally less than or equal to the average diameter of the abrasive particles 6.

FIG. 3 shows a magnetic abrasive particle 6 in greater detail. Each abrasive particle 6 comprises an abrasive grain 16 made of a material harder than the material to be cut. For example, the hardness of the abrasive grain 16 is greater than 430 Hv50 on the Vickers scale and, preferably, greater than or equal to 1000 Hv50. On the Mohs scale, the hardness of the grains 16 is greater than 7 or 8. In some embodiments, the grains 16 are diamond grains.

Each grain 16 is covered with a coating 18 made of a magnetic material, the relative permeability of which is greater than or equal to 50 and, preferably, greater than or equal to 100. The magnetic material used is, for example, a ferromagnetic or ferrimagnetic material. Its Curie temperature is above the temperature reached during electrodeposition of the abrasive particles 6 on the central core 4. Preferably, the material is also an electrically conductive material in order to aid attachment of the particles 6, via the binder 8, to the central core 4. In some embodiments, the material used is preferably a ferromagnetic material comprising one of the following materials: iron, cobalt, nickel, a samarium-cobalt alloy, or neodymium.

The coating 18 is thick enough so that the volume of magnetic material in the abrasive particle 6 enables the particle 6 to be picked up when it is placed in a magnetic induction gradient of 30 T/m and, preferably, of 10 T/m. Typically, to do this, the volume of magnetic material represents more than 1% or 5% of the volume of the abrasive particle 6. In some embodiments, the thickness of the coating 18 is between 0.5% and 100% of the diameter of the abrasive particle grain 16. In other embodiments, the thickness of the coating 18 is between 2% and 50% of the diameter of the grain 16 of the abrasive particle 6.

The thickness of the coating 18 is generally greater than 0.05 μm, and preferably greater than 1 μm, in order to obtain a coating 18 that covers more than 90% of the outer surface of the grain 16.

The coating 18 can be formed in a number of ways. For example, the coating 18 can be deposited on the grain 7 by sputtering, by electrodeposition, by chemical vapor deposition (CVD), or by electroless chemical deposition.

In some embodiments, the coating 18 is nickel. The thickness of the coating 18 is chosen such that it represents more than 10% of the particle 6 by weight and preferably less than 56% of the particle 6 by weight.

In FIG. 1, an arrow F shows the run direction of the central core 4. In the following, upstream and downstream are defined relative to the direction of the arrow F. The various elements of the apparatus 2 are described in the order that the central core 4 meets them in its run direction.

The apparatus 2 comprises a first spool 24 on which the central core 4 to be coated with abrasive particles 6 is wound.

Next, the apparatus 2 optionally comprises a first magnetizing device 26 for magnetizing the central core 4. Other embodiments of a magnetizing device are described with reference to FIGS. 4 to 7 and 21.

Next, the central core 4 meets a point A of mechanical contact with an electrical conductor 32 that is electrically connected to the negative terminal of a first DC-voltage source 28. In some embodiments, the point A is produced using a conductive pulley 30 that is electrically connected to the negative terminal of the DC voltage source 28 by the conductor 32. This conductive pulley 30 typically comprises a groove inside which the central core 4 rubs when it is unwound. In some embodiments, the conductive pulley 30 is fitted so as to be able to rotate freely about an axis perpendicular to the longitudinal direction of the central core 4.

The first DC-voltage source 28 generates an electrolysis current, $i_e$. Typically the density of the electrolysis current $i_e$ is greater than 5 A/dm$^2$ and, generally, lower than 50 A/dm$^2$. The current density is the ratio of the magnitude of the current $i_e$ to the area of the central core 4 that is submerged in a first electrolyte bath 36 held by a first container 34.

The first electrolyte bath 36 comprises an electrolyte 38. The abrasive particles 6 are dispersed in this electrolyte. The electrolyte 38 is typically an aqueous solution containing ions of binder 8. In one embodiment, the solution is a Watts nickel solution and the ions are Ni$^{2+}$ ions.

A first electrode 40, which is electrically connected to the positive terminal of the first DC-voltage source 28, is also submerged in the first electrolyte bath 36. The first electrode 40 therefore forms an anode. The part of the central core 4 submerged in the first electrolyte bath 36 forms a cathode. Typically, the first electrode 40 extends parallel to the longitudinal direction of the central core 4.

Optionally, instead of the first magnetizing device 26, or even in addition to the first magnetizing device 26, a second magnetizing device 44 for magnetizing the abrasive particles 6 and the central core 4 submerged in the first electrolyte bath 36 is provided near the first electrolyte bath 36. One embodiment of the second magnetizing device 44 is described with reference to FIGS. 8 and 9.

Downstream of the first electrolyte bath 36, the apparatus 2 comprises another point B of mechanical contact between the central core 4 and an electrical conductor 46. The electrical conductor 46 is electrically connected to the negative terminal of the first DC-voltage source 28. The point of contact is, for example, produced using a second conductive pulley 48. This second conductive pulley 48 is typically identical to the first conductive pulley 30.

When it leaves the first electrolyte bath 36, the central core 4 is covered with abrasive particles 6 kept thereon by the first binder layer 10. To strengthen the adhesion of the abrasive particles 6 to the central core 4, the apparatus 2 comprises a second container 50 that holds a second electrolyte bath 52 into which the central core 4 is submerged anew in order to deposit the second binder layer 12.

The second electrolyte bath 52, in contrast to the first electrolyte bath 36, contains no abrasive particles 6. The second electrolyte bath 52 is essentially formed from the binder 8. In the illustrated embodiment, the second electrolyte bath 52 is a solution comprising Ni$^{2+}$ ions.

The second container 50 comprises a second electrode 54 connected to the positive terminal of a second DC-voltage source 56. This second electrode 54 therefore forms an anode.

The negative terminal of the second DC-voltage source 56 is connected to two points C and D of mechanical contact between the central core 4 and electrical conductors 58 and 60. These contact points C and D, which are located respectively, upstream and downstream of the second electrolyte bath 52, are each produced using third and fourth conductive pulleys 62, 64. The third and fourth conductive pulleys 62, 64 are identical to the first conductive pulley 30.

By the time the central core 4 is output from the second electrolyte bath 52, the second binder layer 12 has been deposited thereon.

The dashed line downstream of the fourth conductive pulley 64 indicates that other devices may optionally be introduced into the device 2 in order to apply additional treatments to the manufactured abrasive wire 3. Since these treatments are known in the art they are not shown here.

The abrasive wire 3 is then wound on a second spool 68. A motor 70 rotates the second spool 68 to pull the abrasive wire 3 through the first and second electrolyte baths 36, 52.

Figure 4:
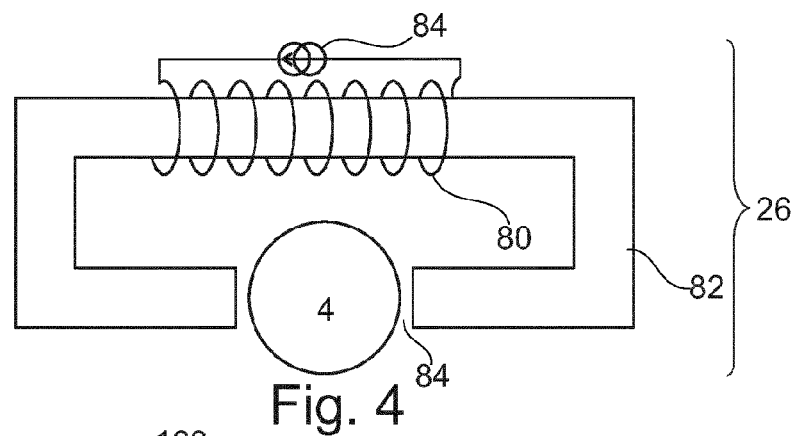
FIGS. 4, 5 and 7 are schematic illustrations of various embodiments of a device for magnetizing a central core of the wire in FIG. 2.

FIG. 4 shows details of the first magnetizing device 26 for magnetizing the central core 4. The first magnetizing device 26 permanently magnetizes the central core 4 so that the latter has a magnetic moment along a radial direction thereof. This permanent magnetization creates a permanent magnetic induction on the surface of the central core 4. The induction is at least greater than 0.1 mT or 0.4 mT and, preferably, greater than 0.5 mT or 1 mT.

To permanently magnetize the central core 4, the first magnetizing device 26 applies a strong DC magnetic field to it. The expression "strong magnetic induction" is understood to mean a magnetic induction the strength of which is greater than 0.1 T and, preferably, greater than 0.5 or 1 T. The expression "strong magnetic field" is understood to mean a magnetic field the strength of which is greater than 800 A/m and, preferably, greater than 4 kA/m or 8 kA/m. In the case of the first magnetizing device 26, this strong magnetic field is applied parallel to a radial direction of the central core 4.

For this purpose, the first magnetizing device 26 comprises a coil 80 through which a DC current flows. The coil is wound around a magnetic core 82. The ends of the coil 80 are connected to a DC-current source 84.

The magnetic core 82 is C-shaped. The ends of the magnetic core 82 face each other and form a gap 84. The central core 4 passes through this gap 84 as it is gradually unwound in the run direction. The first magnetizing device 26 therefore creates a radial magnetic moment with a single south pole and a single north pole that are diametrically opposed on the circumference of the central core. This north pole and this south pole extend in the longitudinal direction of the central core 4.

Permanently magnetizing the central core 4 causes abrasive particles 6 to be more strongly and more rapidly attracted towards it. In addition, and optionally, it makes it possible to omit the second magnetizing device 44. In the latter case, it is the central core 4 itself that forms the source of magnetic induction for attracting the abrasive particles 6.

Figure 5:
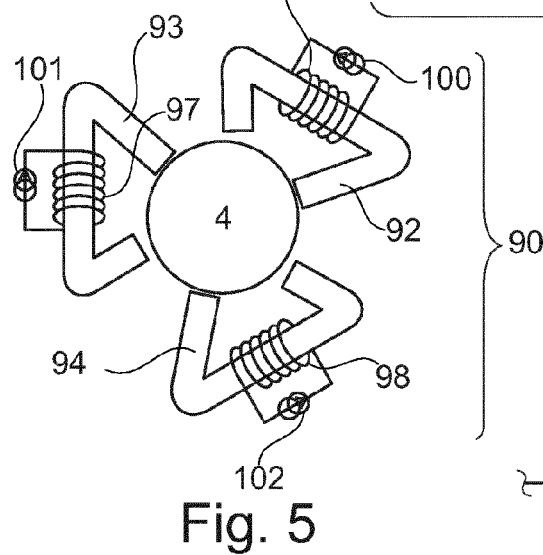

FIG. 5 shows a third magnetizing device 90 that can be used instead of the first magnetizing device 26 for magnetizing the central core 4. This third magnetizing device 90 is able to create, in alternation and at preset locations, around the circumference of the central core 4, a plurality of south poles and a plurality of north poles. For example, in this embodiment, the third magnetizing device 90 comprises three C-shaped magnetic cores 92, 93, 94 distributed around the circumference of the central core 4. These magnetic cores 92, 93, 94 are located in the same plane perpendicular to the longitudinal direction of the central core 4. Each end of each of the magnetic cores 92, 93, 94 is turned towards a respective portion of the central core 4 and located sufficiently near the central core 4 for the field lines of each of the magnetic cores 92, 93, 94 to close via the central core 4.

The third magnetizing device 90 also comprises coils 96, 97, 98 for generating, in each of the cores 92, 93, 94, a strong magnetic field. Each coil 96, 97, 98 is connected to a respective current source 100, 101, 102.

Figure 6:
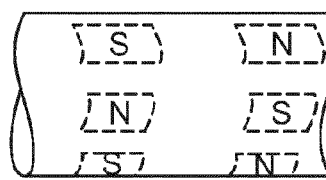
FIG. 6 is a schematic illustration of a section of the central core of the wire in FIG. 2 magnetized using the device in FIG. 5.

The distribution created using the third magnetizing device 90, of south and north poles around the circumference of the central core 4 is shown in FIG. 6. In this figure, squares drawn with dashed lines around an "S" represent south poles, whereas squares drawn with dashed lines around an "N" represent north poles.

To obtain the distribution of south and north poles shown in FIG. 6, the direction of the current generated by the sources 100 to 102 is reversed at regular time intervals. Thus, in addition to obtaining, in alternation, south poles and north poles around the circumference of the central core 4, an alternation of south poles and north poles in the longitudinal direction of the central core 4 is also obtained at the same time.

Distributing poles around the core's circumference positions the abrasive particles 6 to be more uniformity around the circumference. Distributing poles in the longitudinal direction makes it possible to control the density of abrasive particles 6 along the longitudinal direction with greater precision. Preferably, the south poles and the north poles are uniformly distributed around the circumference of the central core 4. Likewise, the south poles and the north poles are preferably distributed uniformly in the longitudinal direction of the central core 4. This especially leads to a uniform distribution of abrasive particles 6 over the entire circumference of the central core 4.

Figure 7:
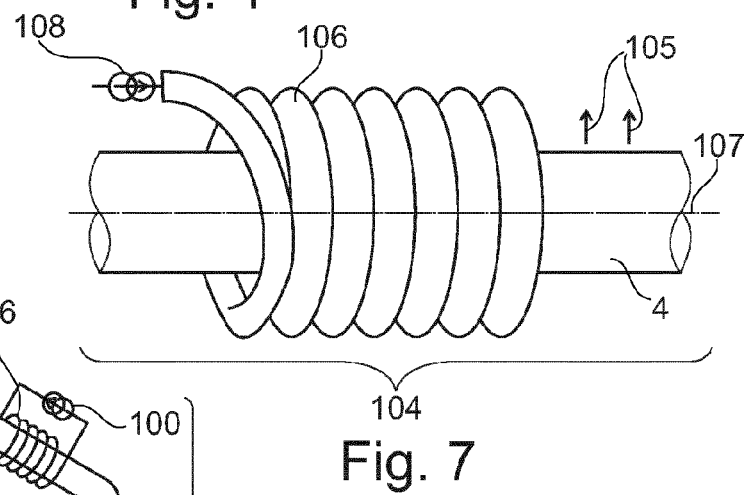

FIG. 7 shows a fourth magnetization device 104 for magnetizing the central core 4. The fourth magnetization device 104 can be used instead of the first magnetizing device 26. In contrast to the device described above, the fourth magnetization device 104 permanently magnetizes the central core 4 only in the longitudinal direction of the central core 4. The permanent magnetization of the central core 4 in its longitudinal direction is typically greater than 1 or 4 mT. Specifically, the central core 4 thus magnetized has, on its surface, a permanent magnetization in the radial direction the magnitude of which is greater than 0.1 or 0.4 mT. In FIG. 7, the arrows 105 show this permanent radial magnetization.

In addition, the radial magnetization is quite uniformly distributed around the circumference of the central core 4, thereby promoting a uniform distribution of the abrasive particles 6 over the entire circumference of the central core 4.

In some embodiments, the fourth magnetization device 104 comprises a solenoid 106 wound around an axis 107. The solenoid 106 is connected to a DC-current source 108 in order to generate a strong magnetic field. As it is unwound, the central core 4 passes through the solenoid 106 along the axis 107.

Figures 8, 9:
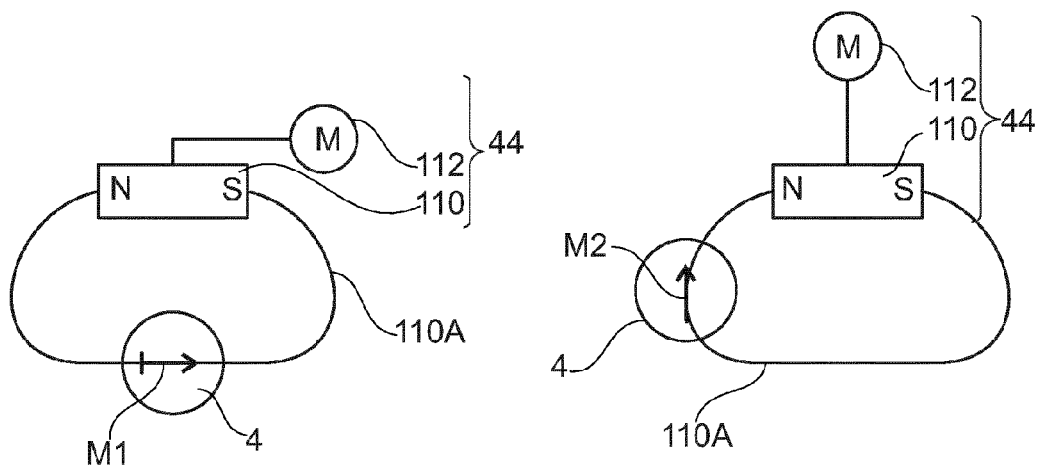
FIGS. 8 and 9 are schematic illustrations of another device for magnetizing the central core and the magnetic abrasive particles of the wire in FIG. 2.

FIGS. 8 and 9 show the magnetizing device in greater detail. The second magnetizing device 44 comprises a plurality of sources of DC magnetic field. Each magnetic-field source creates a magnetic moment in the central core 4 that attracts the magnetic abrasive particles 6 to the latter. The various magnetic-field sources are produced using one and the same group of permanent magnets. These magnets can move between a first position, shown in FIG. 8, and a second position, shown in FIG. 9. To simplify FIGS. 8 and 9, only one permanent magnet 110 has been shown. This permanent magnet generates a permanent magnetic induction of more than 0.1 T or a magnetic field stronger than 800 A/m or 4 kA/m or 8 kA/m.

In the first position, the field lines 110A of the magnet 110 pass right through the cross section of the central core 4 so that the latter is given a first magnetic moment parallel to a first radial direction shown in FIG. 8 by an arrow M1. In the second position, shown in FIG. 9, the magnet 110 is moved in a position such that its field lines 110A pass through the central core 4 so that the latter is given a magnetic moment parallel to a second radial direction shown by an arrow M2 in FIG. 9. The direction M1 is angularly shifted relative to the direction M2 by an angle of between 20° and 160° and, preferably, of between 75° and 115°. Here, this angle is 90° to within ±5°.

The second magnetizing device 44 comprises an actuator 112 that is able to move the magnet 110 between its first and second positions.

Figure 10:
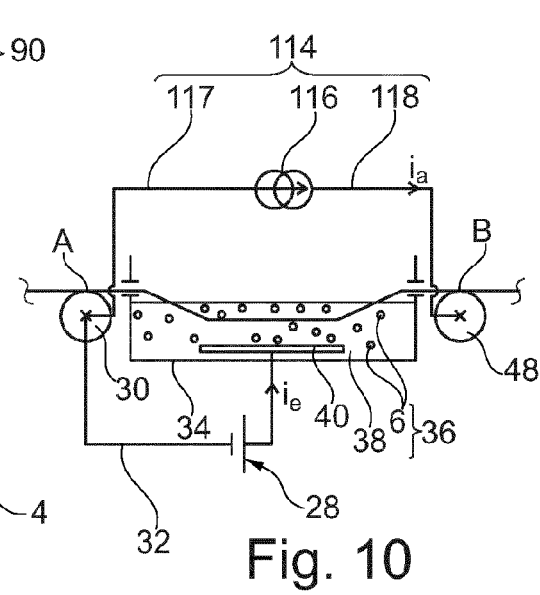
FIG. 10 is a schematic illustration of a device for magnetizing magnetic abrasive particles as shown in FIG. 3.

FIG. 10 shows a fifth magnetizing device 114 for magnetizing, via the central core 4, abrasive particles 6 in the first electrolyte bath 36. This fifth magnetizing device 114 may replace or be used instead of the first and second magnetizing devices 26, 44. The fifth magnetizing device 114 comprises a current source 116 that is electrically connected to the contact points A and B by electrical conductors 117 and 118, respectively. In some embodiments, the mechanical contact between the central core 4 and the conductors 117 and 118 is ensured via the first and second conductive pulleys 30, 48 described above. The source 116 makes it possible for a DC magnetizing current $i_a$ to flow. The current $i_a$ is superposed on the electrolysis current $i_e$ but, in contrast to the latter, the magnitude of the current $i_a$ remains constant throughout the portion of the central core 4 submerged in the first electrolyte bath 36. Thus, the central core 4 generates a magnetic induction that magnetizes the abrasive particles 6 so that the latter are then attracted towards the central core 4. In this embodiment, it is the central core 4 that forms the magnetic induction source that attracts the particles 6 to it. In this embodiment the conductor 46 is preferably omitted so that the electrolysis current $i_e$ and the magnetizing current $i_a$ combine inside the central core 4.

Figure 11:
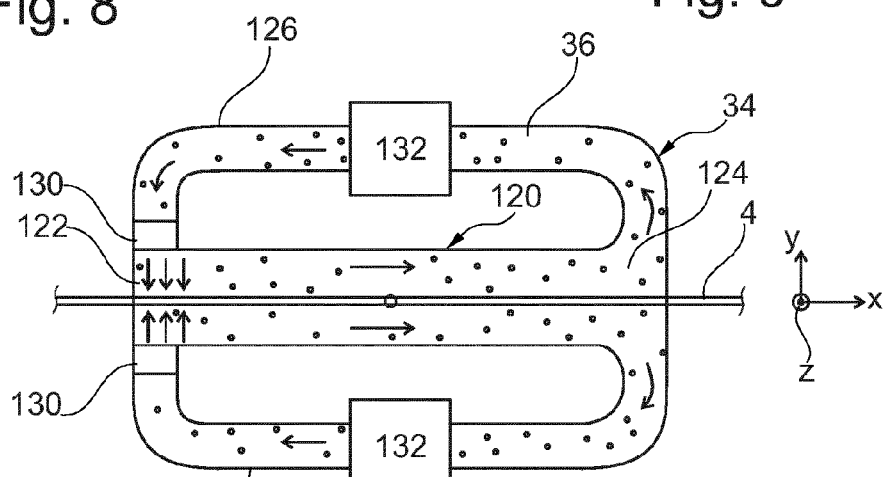
FIG. 11 is a schematic illustration of a container holding a bath of electrolyte, for the apparatus in FIG. 1.

FIG. 11 shows, in greater detail, one embodiment of the first container 34. The various features of this container allow the rate at which the central core 4 moves in the first electrolyte bath 36 to be accelerated without decreasing or increasing the number of abrasive particles 6 deposited on the central core 4. To simplify FIG. 11, the first electrode 40 has not been shown.

The first container 34 comprises a rectilinear duct 120 through which the first electrolyte bath 36 flows parallel to an X direction. The X direction is parallel to the longitudinal direction of the central core 4 and directed in the direction F. The X direction forms, with directions Y and Z an orthogonal coordinate system. The flow direction of the first electrolyte bath 36 in the first container 34 is shown by arrows. The duct 120 extends from an upstream end 122 to a downstream end 124.

The central core 4 passes, submerged in the first electrolyte bath 36, through the duct 120 from the upstream end 122 to the downstream end 124.

The first container 34 also comprises return ducts for returning the first electrolyte bath 36 from the downstream end 124 to the upstream end 122. To simplify FIG. 11, only two return ducts 126, 128 have been shown.

The return ducts 126, 128 extend between the upstream and downstream ends 122, 124. They open onto the upstream end 122 through a first arrangement 130 of spray nozzles. The nozzles of the first arrangement 130 form jets of the first electrolyte bath 36 that strike the central core 4 with a non-zero speed in a radial direction of the central core 4. Typically, the radial component V3 of this speed is greater than V1/2 or 3V1/4, or equal to V1, where V1 is the run speed of the central core 4 in the first electrolyte bath 36. Preferably, the component V3 is also smaller than 1.5V1. If the component V3 of the speed is greater than 50% of the speed V1, then the number of abrasive particles 6 approaching the abrasive wire 3 and then bonding to the abrasive wire 3 is satisfactory. If the component V3 is greater than 150% of the speed V1, the resulting turbulence limits the number of particles 6 bonding to the central core 4. In some embodiments, the radial component of the spray speed is greater than 1 m/min and, preferably, greater than 10 or 60 m/min. Spraying the first electrolyte bath 36 onto the central core 4 in a radial direction allows the number of abrasive particles 6 deposited on this central core 4 to be increased relative to an identical situation in which such nozzles are not used.

The apparatus 2 also comprises a flow-causing device 132 for making the first electrolyte bath 36 advance at a speed V2 parallel to the direction X in the duct 120. The flow-causing device 132 is, for example, formed by suction pumps for pumping the first electrolyte bath 36. Each of these pumps is fitted in one of the ducts 126, 128.

The flow-causing device 132 is adjusted so that the speed V2 of the first electrolyte bath 36 parallel to the direction X in the duct 120 is equal to the speed V1 of the central core 4 moving inside the duct 120. Here, the speed V2 is considered as being equal to the speed V1 and these speeds are equal to ±5 m/min and, preferably, to ±1 m/min or 20 cm/min.

The speed V2 of the first electrolyte bath 36 is measured at a distance of 1 or 2 mm away from the circumference of the central core 4 and more than 1 or 2 mm away from the walls of the duct 120.

Typically, the speed V1 is greater than 6 m/min or 10 m/min and, preferably, greater than 30 m/min or 50 m/min.

Figures 12, 13, 14:
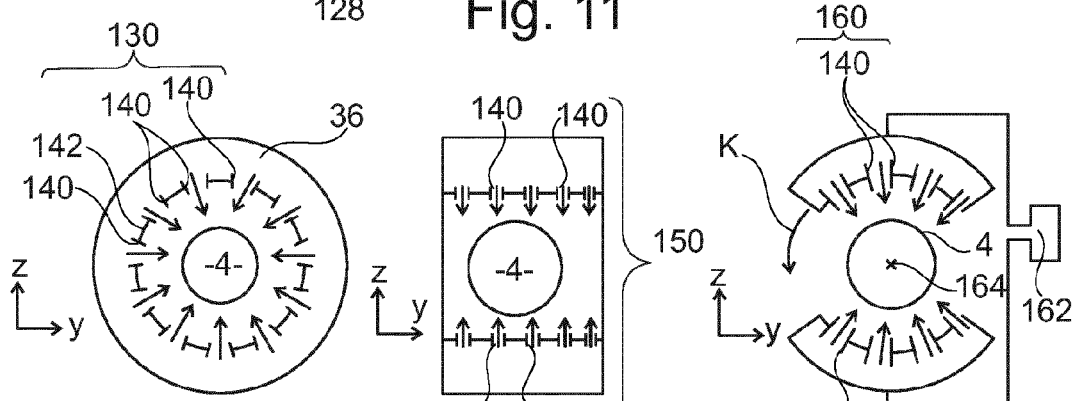
FIGS. 12, 13 and 14 are schematic cross-sectional illustrations of various embodiments of a set of nozzles used in the container in FIG. 11.

FIG. 12 shows, in greater detail, the first arrangement 130 of nozzles in cross section. The first arrangement 130 comprises a plurality of nozzles 140 for spraying the first electrolyte bath 36 onto the central core 4. Each arrow in FIG. 12 represents a jet created by a nozzle 140. In this embodiment, the nozzles 140 are uniformly distributed around the circumference of the central core 4. This enables the abrasive particles 6 to be distributed with greater uniformity around the circumference of the central core 4. Typically, the end of a nozzle 140 is less than 5 mm and, preferably, less than 1 mm from the surface of the central core 4. In the illustrated embodiment, the nozzles 140 are holes formed in a circular wall 142. The nozzles 140 are distributed along a submerged portion of the central core 4. This portion typically represents less than half or a quarter of the total length of the central core 4 that is submerged in the first electrolyte bath 36. The portion comprising the nozzles 140 is upstream of the submerged portion of the central core 4 without nozzles.

FIG. 13 shows a second arrangement 150 of nozzles that can be used instead of the first arrangement 130. This second arrangement 150 is identical to the first arrangement 130 except that the nozzles 140 are not uniformly distributed around the circumference of the central core 4. In the illustrated embodiment, the nozzles 140 are arranged only in an upper plane and a lower plane located, respectively, above and below the central core 4.

FIG. 14 shows a third arrangement 160 of nozzles that can be used instead of the first arrangement 130. This third arrangement 160 is identical to the first arrangement 130 except that the nozzles 140 are only uniformly distributed and face-to-face along two diametrically opposed angular segments of the central core 4. Typically, each angular segment extends over more than 10° or 25°. These two angular segments are separated from each other by angular segments without nozzles, these segments each extending over more than 10° or 25°. In addition, in this embodiment, an actuator 162 is provided for rotating the third arrangement 160 about an axis 164 parallel to the Z direction. The axis 164 of rotation is coincident with the axis of the central core 4. An arrow K shows the direction of rotation of the nozzles 140 about the central core 4. The third arrangement 160 enables the abrasive particles 6 to be distributed around the circumference of the central core 4 in a spiral pattern.

Figure 15:
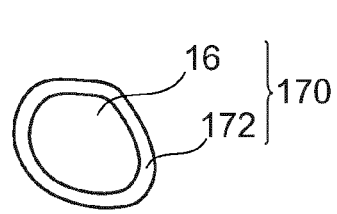
FIGS. 15, 16, 17 and 18 show various embodiments of the magnetic abrasive particle in FIG. 3.

FIGS. 15 to 18 show other possible embodiments of abrasive particles 6. For example, FIG. 15 shows an abrasive particle 170 that is identical to the particle 6 except that the coating 18 is replaced by a coating 172. The coating 172 is identical to the coating 18 except that it is permanently magnetized so as to have a permanent magnetic induction on its surface of 0.1 or 1 mT or more and, preferably, of 5 mT or more, in a direction normal to its surface. When the abrasive particle 170 is used instead of the abrasive particle 6, the magnetizing devices 26, 44 and 114 can be omitted. It is then the particle 170 itself that forms the source of magnetic induction capable of attracting it to the central core 4. The preceding remarks regarding the particle 170 also apply to the following other embodiments of the abrasive particle.

Figure 16:
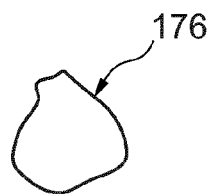

FIG. 16 shows an abrasive particle 176. The particle 176 is made entirely from a ferromagnetic or ferrimagnetic material that is harder than the material to be cut. The expression "made entirely from" is understood to mean that the ferromagnetic or ferrimagnetic material represents more than 90% and, preferably, more than 95 or 97% of the weight of the abrasive particle. In this embodiment, it is not necessary to cover the abrasive particle with a coating. For example, the ferromagnetic material used is $CrO_2$, which is harder than silicon and keeps its magnetic properties up to a Curie temperature of about 80° C.

Figure 17:
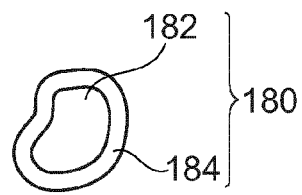

FIG. 17 shows an abrasive particle 180 formed from a magnetic core 182 coated with a coating 184 forming an abrasive layer.

Figure 18:
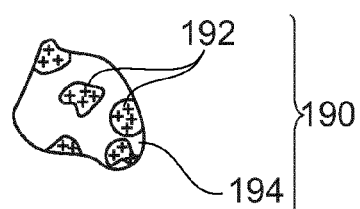

FIG. 18 shows an abrasive particle 190 formed from abrasive fragments 192 bound to one another by a magnetic material 194. In some embodiments, the fragments 192 are diamond fragments and the material binding them to form the particle 190 is cobalt.

Figure 19:
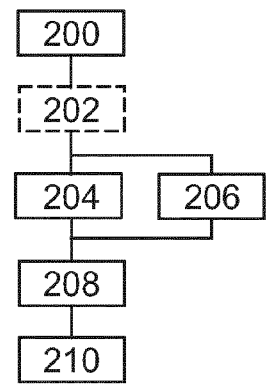
FIG. 19 is a flow chart of a process for manufacturing the wire in FIG. 2 using the apparatus in FIG. 1.

Operation of the apparatus 2 will now be described with reference to the process of FIG. 19. During step 200, the central core 4 is unwound from the first spool 24 by the motor 70. In some practices, the central core 4 is unwound at a speed greater than 6 m/min and, preferably, greater than 10, 30, 40 or 60 m/min. Each section of the central core 4 moves and is then subjected to the following steps in succession.

Figure 21:
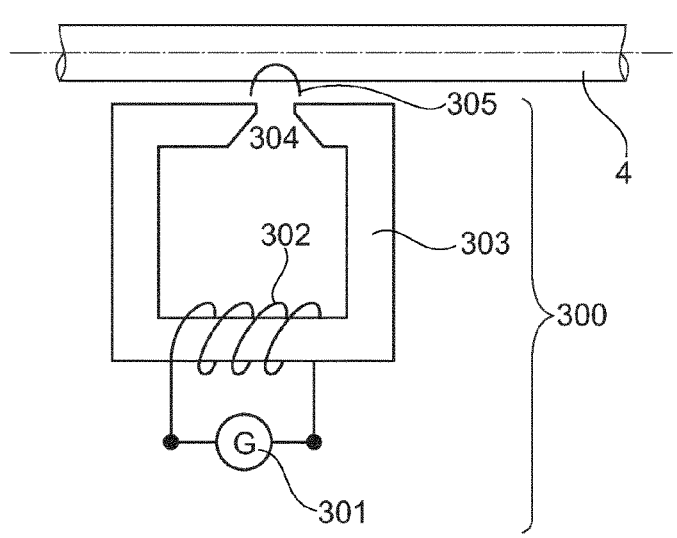
FIG. 21 is a schematic illustration of a last embodiment of a device for magnetizing a central core of the wire in FIG. 2.

Optionally, during step 202, the central core 4 is permanently magnetized by the magnetizing device 26, 90, 104 or the one shown in FIG. 21.

Next, during step 204, the abrasive particles 6 and the binder 8 are deposited on the central core 4. In this embodiment, the abrasive particles 6 and the first binder layer 10 are deposited at the same time by electrolysis in the first container 34. For this purpose, in step 204, the DC-voltage source 28 applies a potential difference between the first electrode 40 and the submerged portion of the central core 4. At the same time, the flow-causing device 132 propels the first electrolyte bath 36, inside the duct 120, parallel to the central core 4, so as to create a flow of electrolyte along the central core 4 that moves at non-zero speed V2 equal to the speed V1 to within ±5 m/min. Operation of the flow-causing device 132 also causes the first electrolyte bath 36 to be sprayed on the central core 4 via the nozzles 140.

Optionally, in parallel, during step 206, the particles 6 present in the first electrolyte bath 36 are subjected to an external magnetic field to attract them to the central core 4. In this step, the second magnetizing device 44 can create the external magnetic field. In this case, the external magnetic field magnetizes both the central core 4 and the abrasive particles 6. Typically, the second magnetizing device 44 is employed if step 202 is not implemented. In contrast, if step 202 is implemented the second magnetizing device 44 is preferably not employed.

In step 206, the external magnetic field may also be created by the fifth magnetizing device 114. The fifth magnetizing device 114 may be used in addition to the first, second, third, and fourth magnetizing devices 26, 44, 90, 104, or in addition to a sixth magnetizing device 300 discussed below in connection with FIG. 21, or instead of any of the foregoing magnetizing devices.

In step 206, the abrasive particles 6 are attracted toward the central core 4 and kept on the central core 4 by an attractive magnetic force.

The presence of a magnetic induction for attracting abrasive particles 6 toward the central core 4 thus enables faster deposition of abrasive particles 6 on the central core 4; and also makes it more difficult for hydrodynamic turbulence related to the movement of the central core 4 through the first electrolyte bath 36 to unbind the particles 6 from the central core 4.

In step 208, the second binder layer 12 is deposited by electrolysis in the second electrolyte bath 52.

Finally, during step 210, the abrasive wire 3 thus manufactured is wound onto the second spool 68.

Figure 20:
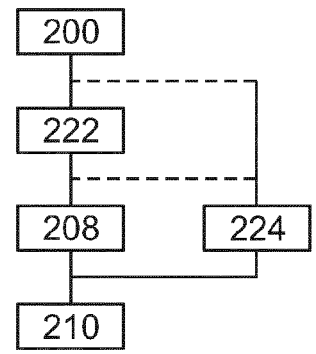
FIG. 20 is a flow chart of another process for manufacturing the wire in FIG. 2.

FIG. 20 shows another possible embodiment of the process for manufacturing the abrasive wire 3. This process is identical to the process in FIG. 19 except that step 204 is omitted and steps 202 and 206 are replaced by steps 222 and 224, respectively.

In step 222, magnetized abrasive particles 6 are deposited on the central core, which is made of a magnetic material. The abrasive particles 6 are then attracted to and kept on the central core 4. Step 222 is carried out before the central core 4 is submerged in an electrolyte bath. Step 222 is directly followed by step 208.

In step 224, an external magnetic field is applied to keep the abrasive particles 6 on the central core 4. This external magnetic field is, for example, applied using the second magnetizing device 44 but without necessarily moving the magnet 110. Step 224 may start at the same time as step 222 or just after step 222. Ideally, step 224 continues until the abrasive particles 6 are attached to the central core 4 by the binder. For example, step 224 continues until the end of step 208. This way of producing the abrasive wire 3 makes it possible to obtain a uniform distribution of particles 6 around the circumference of the central core 4.

FIG. 21 shows a sixth magnetizing device 300 for magnetizing the central core 4. The sixth magnetizing device 300 replaces, for example, the first, third, and fourth magnetizing device 26, 90 or 104. It makes it possible to magnetize the central core 4 to form alternating south poles and north poles in its longitudinal direction at preset locations.

The sixth magnetizing device 300 comprises a generator 301 that delivers a periodic current to a coil 302. In a particular mode of operation, the generator 301 reverses the direction of the current at each instant $t_0$. Preferably, these instants $t_0$ are regularly spaced in time. Between two successive instants $t_0$, the magnitude of the current remains constant. The duration of the plateau in the magnitude of the current thus obtained between two successive instants $t_0$ is, for example, two or ten times larger than the length of time required to pass from one plateau to another following the change in direction of the current.

The coil 302 transforms the current into a magnetic field having the same waveform. This magnetic field is concentrated inside a magnetic core 303 around which the coil 302 is wound. The magnetic core 303 forms a closed magnetic circuit comprising a gap 304. A main magnetic flux passes through the gap, and a secondary or leakage magnetic flux encircles it. This secondary magnetic flux passes outside of the gap 304. A field line 305 of this secondary magnetic flux is shown in FIG. 21. The gap 304 is placed near the central core 4 so that the secondary magnetic flux closes via the central core 4. Thus, the central core 4 is not placed inside the gap. More precisely, the field lines of the secondary magnetic flux extend inside the central core 4 essentially along the longitudinal direction of the central core 4.

During operation of the sixth magnetizing device 300, the central core 4 still moves in the same direction parallel to its longitudinal direction. The sixth magnetizing device 300 then applies a magnetic field parallel to the longitudinal direction of the central core 4 in one direction and then in the opposite direction while the central core 4 moves relative to the sixth magnetizing device 300.

Figure 22:
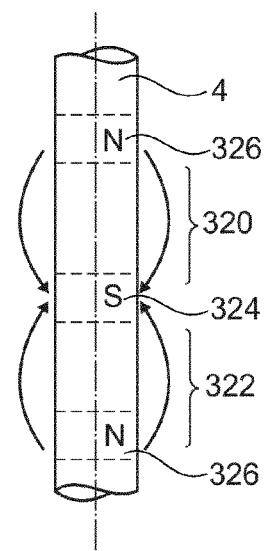
FIG. 22 is a schematic illustration of a section of the central core of the wire in FIG. 2, magnetized using the device in FIG. 21.

As will now be explained with reference to FIG. 22, the sixth magnetizing device 300 makes it possible to magnetize, in alternation, the central core 4, which runs through the secondary magnetic flux, in one direction and in the opposite direction. Proceeding in this way can result in creation of domains or zones 320, 322 on the surface of the central core 4 in which the magnetization direction is uniform. These domains 320, 322 are arranged in succession one after the other along the length of the central core 4.

Two immediately consecutive domains 320, 322 have different and generally opposite magnetization directions. Between these two immediately consecutive domains 320, 322 there is therefore a discontinuity in the magnetization direction. At each of these discontinuities, there is a "leakage" magnetic field that exits radially from the central core 4. Thus, at each of these discontinuities, an induction peak is observed. This "leakage" magnetic field first exits in one direction, and then exits in the opposite direction, thereby creating an alternation of south poles 324 and north poles 326 on the surface of the central core 4. A few field lines between these south poles 324 and north poles 326 are shown by the arrows in FIG. 22. In the illustrated embodiment, the south and north poles are annular and extend around the entire circumference of the central core 4.

In practice, the use of the sixth magnetizing device 300 has been demonstrated to be more effective than the use of the fourth magnetizing device 104 for attracting the magnetic abrasive particles 6 to the central core 4.

The use of a magnetic induction to attract abrasive particles 6 to the central core 4 leaves characteristic traces on the abrasive wire 3 thus manufactured. This is because the use of the magnetic induction induces a specific organization of abrasive particles 6 over the central core that does not exist in the case where this magnetic induction is not used. This specific organization depends on the magnetizing device used. For example, if some of the abrasive particles 6 are oblong and are greater in length along a major axis, when the central core or the abrasive particles 6 are magnetized by a device such as the first, second, third, or sixth magnetizing devices 26, 44, 104 or 300 and possibly the fifth magnetizing device 114, the major axis of the oblong particles 6 tends to align along the normal to the surface of the central core. Typically, for at least 55% of the oblong particles 6 and, generally, for more than 80% or 90% of the oblong particles 6, the angle between their major axis and the normal to the surface of the central core passing through the particle is smaller than 70° or 45° or 30°. In other words, a corner of the oblong particles 6 is directed toward the central core 4 whereas the opposite corner is directed toward the exterior of the abrasive wire 3. This promotes the erosion of the material to be cut because for most oblong particles, it will be the corner of the oblong particle 6, rather than the side, that protrudes from the outer surface of the abrasive wire 3 rather than its sides. For this reason, in certain embodiments, at least 10% and, generally, at least 30% or 50% to 80% of the abrasive particles 6 are oblong particles 6. Preferably, the aspect ratio of the oblong particles 6 is greater than 1.5 or 2 or 4. The aspect ratio is defined as being the length of the oblong abrasive particle along its major axis divided by its width along its minor axis. This minor axis lies perpendicular to the major axis and cuts the major axis halfway between the most distant points, of the particle, located on this major axis. Among the multitude of possible minor axes distributed around an angular portion of 180°, the one used to measure the width is the one that gives the smallest value for the width.

If the abrasive particles 6 are attracted to and kept by magnetization on the central core 4 before being submerged in the electrolyte bath, then more than 70% or 85% of the abrasive particles 6 make direct mechanical contact with the central core 4 in the abrasive wire 3 thus manufactured. Such an organization of abrasive particles 6 is not obtained when the abrasive particles 6 are deposited using the first electrolyte bath 36 without applying a magnetic induction. Specifically, in the latter case, a substantial portion of the abrasive particles 6 attach belatedly to the central core 4. The belatedly attached particles 6 are then located further away from the central core 4 than the particles 6 attached beforehand. At the present time, the only means for effectively attaching and retaining abrasive particles 6 on the central core 4 before submerging them in the electrolyte bath appears to be application of a magnetic induction. Thus, the arrangement of abrasive particles 6 as described above is also characteristic of the use of a magnetization to attract the particles 6 to the central core 4 before the deposition of the binder. If the central core 4 has already been coated with a tie layer before the abrasive particles 6 are attracted to and kept on the central core 4 by magnetization, then the foregoing remains valid except that 70% to 85% of the abrasive particles 6 then make direct contact with the tie layer and no longer make direct mechanical contact with the central core 4. In the case where the central core 4 has a radial magnetic moment, the density of abrasive particles 6 may be greater near the magnetic poles created on the central core 4.

In addition, application of the magnetic induction during the electrolytic deposition may also result in a specific organization of the molecules of the binder 8 on the central core 4. In particular, in the case where the central core 4 used exhibits alternating of south and north poles, this alternation of poles may result in a corresponding alternation in the specific organization of these molecules of binder 8. For example, the specific organization may be an orientation of the crystals of the binder. The orientation of the crystals may be measured using a scanning electron microscope and by electron backscatter diffraction (EBSD).

If the central core 4 or particles 6 are permanently magnetized during the manufacture of the abrasive wire 3, the core 4 or abrasive particles 6 of the abrasive wire 3 thus manufactured will have a permanent magnetization if the abrasive wire 3 is not deliberately demagnetized before being sold. However, the field lines tend to remain in the layer of binder. Thus, the measurable magnetic induction of the abrasive wire 3 may be very much smaller than that measurable for the central core 4 before it is covered with the binder. For example, a remanent magnetic induction of 1.2 mT at the surface of the central core 4 produces a remanent magnetic induction of 0.1 mT at the surface of the abrasive wire 3 after the layer of binder 8 has been deposited. The remanent magnetic induction at the surface can be measured using a MAGSYS (Dortmund, Germany) HGM 09 s gaussmeter with an HGM T 02 45 035 0 radial probe. Preferably, the measurement is carried out in a chamber sheltered from surrounding magnetic fields, and taking into account Earth's magnetic field, to be capable of measuring very weak magnetic fields.

Many other embodiments are possible. For example, the central core 4 could be formed from a number of intertwined strands. Likewise, the central core 4 could be steel or made from materials other than steels. For example, the central core 4 could also be made of a diamagnetic or paramagnetic material.

The coating 18 of the abrasive particles 6 is not necessarily a conductive material.

The grain 16 could be made from many different abrasive materials. For example, it could be made of SiC, $SiO_2$, WC, $Si_3N_4$, boron nitride, $CrO_2$, or aluminum oxide.

The binder 8 could also be made from a material other than a metal. For example, in some embodiments, the binder could be a resin.

The various magnetizing devices described herein could be combined together. In particular, the fourth magnetizing device 104 could be combined with any one of the other magnetizing device described above so as to combine a permanent axial magnetization with radial magnetization of the central core 4.

A number of sixth magnetizing devices 300 can be distributed around the central core 4 to improve the uniformity of the magnetization around this central core 4.

The third magnetizing device 104, or any device able to magnetize the central core 4 in its longitudinal direction, may be modified to create alternating north and south poles along the length of the abrasive wire 3, as described with reference to FIG. 22. For example, alternating magnetization directions along the central core 4 may be obtained by reversing, at predefined intervals, the direction of the DC current flowing in the coil 106 of the third magnetizing device 104. Then, along the length of the central core 4, a longitudinal magnetization is obtained, the direction of which alternates between two opposite directions. To create alternating north and south poles, it is also possible to modify the first magnetizing device 26 so that the current source 84 regularly reverses the direction of the DC current that it makes flow through the coil 80. Other methods are possible for creating discontinuities in the longitudinal magnetization of the central core 4. For example, in another embodiment, mechanical discontinuities, such as grooves or ribs, are produced on the surface of the central core 4. Typically, the depth of the grooves or the height of the ribs is greater than 5% or 10% or 20% of the diameter of the central core 4. These grooves or ribs also create discontinuities in the magnetization of the central core 4 and therefore corresponding magnetic induction peaks in the location of these discontinuities. In the latter embodiment, the direction of the magnetic field used to longitudinally magnetize the central core 4 may be constant. The mechanical discontinuities may also take forms other than grooves or ribs. For example, a discontinuity may be created by impurities or the like implanted locally in the central core 4 at predetermined locations.

In one embodiment, the first magnetizing device 26 may be omitted. In this case, the central core 4 is not permanently magnetized. The abrasive particles 6 are then attracted to the central core 4 either by the second magnetizing device 44 or by a magnetizing device such as the fifth magnetizing device 114, or even by permanent magnetization of the abrasive particles 6. In particular, the second magnetizing device 44 alone may be used.

In the magnetizing devices, such as the first and third magnetizing devices 26 and 90, the coils may be replaced by permanent magnets.

In another embodiment, the second magnetizing device 44 comprises a single magnetic-field source. In this case, the magnetic-field source creates a magnetic moment only in the central core 4, the direction of which is still the same. The actuator 118 may then be omitted. In the latter embodiment, the central core 4 is then preferably rotated to increase the uniformity of the distribution of abrasive particles 6 around its circumference.

In another embodiment, the second magnetizing device 44 comprises a plurality of stationary magnetic-field sources arranged one after the other along the direction F. A first and a second of these sources are arranged to create, in the central core 4, magnetic moments in directions M1 and M2, respectively. Thus, as the central core 4 gradually advances through the first electrolyte bath 36, it first exhibits a magnetic moment in the direction M1 when it is in the field lines of the first source, and then a magnetic moment in the direction M2 when it is in the field lines of the second source.

The magnet 112 could be replaced by a source of magnetic field that varies over time. Specifically, once the abrasive particles 6 have been fixed to the central core 4, the magnetic field of the source may be turned off or modified. For example, the source may be modified to alternate regularly between a state in which it generates the magnetic field and a state in which it does not generate a magnetic field.

When the magnetizing device is the fifth magnetizing device 114, it is not necessary for the central core 4 to be made of a magnetic material. For example the central core 4 could be made of tungsten. This is because the fifth magnetizing device 114 makes it possible for abrasive particles 6 to be attracted to a central core 4 made of a non-magnetic material when this central core 4 is submerged in the first electrolyte bath 36.

The current generated by the fifth magnetizing device 114 is not necessarily DC. In one embodiment, it varies over time. For example, at regular intervals, the current tends to zero.

The various magnetizing devices described above may be only intermittently activated to create sections of central core 4 that are permanently magnetized and sections of central core 4 that are not permanently magnetized. This allows a plurality of successive sections having alternating magnetizations to be produced along the length of the abrasive wire 3, with each section having an abrasive-particle density that is different from that of the adjacent sections immediately upstream and downstream it. This makes it possible to produce, in alternation, sections with abrasive-particle densities that are at least ten times greater than the particle densities of adjacent sections.

The passage into the second electrolyte bath 52, to deposit an additional layer of binder, may be omitted if the first binder layer 10 deposited in the first electrolyte bath 36 is sufficiently thick to keep the abrasive particles 6 adequately attached to the central core 4.

In another embodiment, the first and second binder layers 10 and 12 are not deposited immediately after each other. For example, the first binder layer 10 is first deposited over the entire length of the central core 4, then the central core 4 thus coated only with the first binder layer 10 is wound on a spool then transported to another electrolyte bath. Next, the second binder layer 12 is deposited over the entire length of the central core 4 by another machine. Thus, the deposition of the first and second binder layers 10, 12 may be carried out at different speeds.

In another embodiment, the steps of depositing the abrasive particles 6 and the layers are each repeated a plurality of times so as to obtain a stack of concentric layers around the central core 4, each layer being formed by abrasive particles 6 and binders. The multilayer abrasive wire 3 thus obtained is more resistant to wear.

The device for making the electrolyte flow in the first electrolyte bath 36 may be produced using a propeller comprising blades made to rotate about an axis. These blades each typically have an area of more than 1 $cm^2$. Preferably, the propeller is placed in a return duct or ducts.

In one embodiment, the spray nozzles 140 are omitted. In this case, the first electrolyte bath 36 is simply made to flow at the same speed as the central core 4.

In another embodiment, each nozzle 140 is formed by a tube that is at least twice as long as it is wide. This improves the directivity of the jet of the first electrolyte bath 36. The nozzles 140 can be oriented so that the jet also has a non-zero speed component in the X-direction. For example, the nozzles 140 may be inclined at an angle of greater than 95° or less than 85° relative to the direction of the coil. Orienting the nozzles 140 with a component in the X-direction prevents a gradient from forming in the speed of the particles 6 at the nozzles 140 and makes it possible to distribute the particles 6 over the entire length of the part of the coil 4 submerged in the bath 36.

Some embodiments omit the flow-causing device 132 for making the first electrolyte bath 36 flow at the same speed as the central core 4.

The binder may be deposited on the central core 4 by means other than electrolysis. For example, in some practices, the electrolysis is replaced by an electroless chemical deposition such as electroless nickel plating. For this purpose, a reducing molecule such as sodium hypophosphite ($Na(H_2PO_2)$) is used.

When deposited by methods other than electrolysis, the binder can be made of a nonconductive material, such as an insulating resin.

The abrasive particles 6 can also be deposited outside of the electrolyte bath. For example, the central core 4 can be permanently magnetized. Once magnetized, the abrasive particles 6 are sprayed onto the central core 4 before submerging it into the electrolyte bath. The abrasive particles 6 are then retained by magnetization on the central core 4. The central core 4, thus coated, is then submerged in an electrolyte bath. In this case, the electrolyte bath does not necessarily contain abrasive particles 6.

The foregoing description also applies to the case in which the central core 4 does not move when it is submerged in the electrolyte bath. For example, the central core 4 may be a closed loop. In this case, the entire loop is submerged in the bath at the same time. The central core 4 is then kept stationary in the electrolyte bath.

A plurality of abrasive wires 3 can be manufactured in parallel. In this case, a plurality of central cores 4 is simultaneously submerged in parallel in the same electrolyte baths described above. Each core 4 moves parallel to the others. This makes it possible to reduce the amount of machinery required to manufacture the abrasive wire 3.

Having described the invention, and a preferred embodiment thereof, what is claimed as new, and secured by Letters Patent is:

1. A process for manufacturing an abrasive wire formed by abrasive particles that are kept on a central core by a binder, said process comprising providing a central core, depositing magnetic abrasive particles on said central core, and depositing a binder on said central core, wherein said central core comprises a surface, wherein north poles and south poles are disposed on said surface, wherein said north poles and south poles are distributed in alternation along at least one of a circumference of said central core and a length of said central core, wherein, as a result of said distribution, a south pole is adjacent to two north poles, wherein, as a result of said distribution, a north pole is adjacent to two south poles, wherein each magnetic abrasive particle comprises a magnetic material, wherein said magnetic material has a relative permeability that is greater than 50, wherein said magnetic material represents at least 1% of a volume of said magnetic abrasive particle, wherein depositing said magnetic abrasive particles creates a magnetic interaction between said central core and said abrasive particles, wherein said magnetic interaction attracts said abrasive particles to said central core, and wherein depositing said binder on said central core results in keeping said abrasive particles attached to said central core.

2. The process of claim 1, wherein providing a central core comprises providing a central core that has, at each south pole and at each north pole on said surface thereof, a permanent magnetic induction that is greater than 0.1 mT, wherein said permanent magnetic induction is directed in a radial direction of said central core.

3. The process of claim 1, wherein providing a central core comprises providing a central core that has, at each south pole and at each north pole on said surface thereof, a permanent magnetic induction that is greater than 0.4 mT, wherein said permanent magnetic induction is directed in a radial direction of said central core.

4. The process of claim 1, wherein providing a central core comprises providing a central core that has a permanent magnetic induction of at least 1 mT parallel, wherein said magnetic induction has a direction that is within ±10° of a longitudinal direction of said central core.

5. The process of claim 3, further comprising, before providing said central core, applying a first external magnetic field to magnetize said central core, and applying a second external magnetic field to magnetize said central core, wherein said central core, as a result of having been magnetized by said first external magnetic field, has a first magnetic moment aligned with a longitudinal direction of said central core, and wherein, as a result of having been magnetized by said second external magnetic field, said central core has a second magnetic moment that is parallel to said first magnetic moment and directed in a direction opposite that of said first magnetic moment.

6. The process of claim 1, wherein depositing magnetic abrasive particles on said central core, and depositing a binder on said central core are carried out at least twice.

7. The process of claim 1, wherein depositing a binder on said central core comprises moving said central core in a longitudinal direction thereof inside an electrolyte bath, wherein said electrolyte bath comprises ions of said binder; and applying an electric potential difference between said moving central core and a working electrode to cause deposition by electrolysis of said binder on said central core.

8. The process of claim 1, wherein depositing a binder on said central core comprises depositing said binder on said central core by electrolysis.

9. An apparatus for manufacturing abrasive wire formed by abrasive particles that are held on a central core by a binder, said apparatus comprising a particle-deposition unit, a binder-deposition unit, and a magnetizing device, wherein said particle-deposition unit is configured for depositing magnetic abrasive particles on said central core, wherein each magnetic abrasive particle comprises magnetic material, wherein each magnetic abrasive particle has a relative permeability that is greater than 50, wherein said magnetic material represents at least 1% of a volume of said magnetic abrasive particle, wherein said binder-deposition unit is configured for depositing said binder on said central core to keep said abrasive particles attached to said central core, wherein said magnetizing device is configured to magnetize said central core such that, prior to entry into said particle-deposition unit for deposition of abrasive particles thereon, said central core has north poles and south poles distributed in alternation along a surface thereof in a direction selected from the group consisting of a circumferential direction of said central core and a longitudinal direction of said core, wherein said north poles and said south poles attract said magnetic abrasive particles to said central core during deposition of said magnetic abrasive particles on said central core.

10. A manufacture comprising an abrasive wire, wherein said abrasive wire comprises a central core and magnetic abrasive particles, wherein said magnetic abrasive particles are held on said central core by a binder, wherein said central core comprises north poles and south poles disposed on said surface, wherein said north poles and said south poles are distributed in alternation along at least one of a circumference of said central core and a length of said central core.

11. The manufacture of claim 10, wherein said central core has a remanent magnetization greater than 5 mT.

12. The manufacture of claim 10, wherein said magnetic abrasive particles comprise oblong particles, each of which has a major axis and a minor axis, wherein for at least 80% of said oblong particles, an angle between said major axis and a line normal to said surface of said central core that passes through said oblong particle is between 0° and 70°.

13. The manufacture of claim 10, wherein for at least 85% of said magnetic abrasive particles, a shortest distance between said magnetic abrasive particle and said surface of said central core is within ±1 µm of a constant value.

* * * * *